(12) United States Patent
Hsu et al.

(10) Patent No.: US 7,891,859 B2
(45) Date of Patent: Feb. 22, 2011

(54) FRAME AND BACKLIGHT MODULE USING THE SAME

(75) Inventors: Tung-Ming Hsu, Taipei Hsien (TW); Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 543 days.

(21) Appl. No.: 11/957,505

(22) Filed: Dec. 17, 2007

(65) Prior Publication Data
US 2009/0128730 A1   May 21, 2009

(30) Foreign Application Priority Data
Nov. 19, 2007   (CN) .................... 2007 1 0202588

(51) Int. Cl.
*F21V 7/04* (2006.01)
(52) U.S. Cl. .................. 362/633; 362/634; 362/311.14; 362/97.4; 362/311.01; 349/58
(58) Field of Classification Search ................. 362/606, 362/633, 634, 97.1, 97.2, 97.3, 97.4, 311.01, 362/311.06, 311.14, 311.15, 326, 330, 339; 359/599; 349/58, 64
See application file for complete search history.

(56) References Cited

U.S. PATENT DOCUMENTS

| 7,101,074 B2 * | 9/2006 | Kuo et al. ................... 362/634 |
| 2003/0048629 A1 * | 3/2003 | Kim et al. ..................... 362/27 |
| 2005/0206805 A1 * | 9/2005 | Lee et al. ...................... 349/64 |

FOREIGN PATENT DOCUMENTS

| CN | 1641445 A | 7/2005 |
| CN | 1804699 A | 7/2006 |
| CN | 1825185 A | 8/2006 |

\* cited by examiner

*Primary Examiner*—Ismael Negron
(74) *Attorney, Agent, or Firm*—Frank R. Niranjan

(57) ABSTRACT

A backlight module frame having a plurality of optical elements includes a bottom frame, a plurality of fixing members, and two pre-assembled members. Each pre-assembled member has a latching portion. The optical elements are stacked together and fixed to the latching portions of the pre-assembled members. The pre-assembled members are fixed to the bottom frame with the fixing members.

7 Claims, 7 Drawing Sheets

FRAME AND BACKLIGHT MODULE USING THE SAME

BACKGROUND OF THE INVENTION

1. Field of the Invention

The present invention relates to frames, and particularly, to a frame used in a backlight module.

2. Discussion of the Related Art

In a liquid crystal display device (LCD device), liquid crystal is a substance that does not itself illuminate light. Instead, the liquid crystal relies on light received from a light source to display information. In the case of a typical liquid crystal display device, a backlight module powered by electricity supplies the needed light.

FIG. 7 depicts a backlight module 100. The backlight module 100 includes a frame 11, a reflective plate 12, a plurality of lamps 13, a light diffusion plate 14, a lower light diffusion film 15, a prism sheet 16 and an upper light diffusion film 17. The frame 11 includes a bottom frame 111 and an upper frame 113. The bottom frame 111 defines a receiving chamber 110. The lamps 13 are aligned apart in the receiving chamber 110. The reflective plate 12 is positioned on a base of the bottom frame 111. The light diffusion plate 14, the lower light diffusion film 15, the prism sheet 16 and the upper light diffusion film 17 are positioned on the bottom frame 111 over the receiving chamber 110 in that order. The upper frame 113 is assembled to the bottom frame 111 for fixing the light diffusion plate 14, the lower light diffusion film 15, the prism sheet 16 and the upper light diffusion film 17 on a top of the bottom frame 111 tightly.

In assembling, firstly, the reflective plate 12 is positioned on the base of the bottom frame 111. Secondly, the lamps 13 are regularly disposed in the receiving chamber 110 of the bottom frame 111. Thirdly, optical elements, such as the light diffusion plate 14, the lower light diffusion film 15, the prism sheet 16 and the upper light diffusion film 17, are respectively positioned on the bottom frame 111 over the receiving chamber 110 in that order. Finally, the upper frame 113 is positioned on the upper light diffusion film 17 and fixed to the bottom frame 111. However, the process of fixing optical elements on the bottom frame 111 requires high precision and costs time. In addition, this process is easy to damage or scratch the optical elements. Thus, the backlight module 100 is unduly complicated in assembling and therefore costly to manufacture.

What is needed, therefore, is a new frame and a backlight module using the frame that can overcome the above-mentioned shortcomings.

SUMMARY

In one aspect, a frame used in a backlight module having a plurality of optical elements according to a preferred embodiment includes a bottom frame, a plurality of fixing members, and two pre-assembled members. Each pre-assembled member has a latching portion. The optical elements are stacked together and fixed to the latching portions of the pre-assembled members. The pre-assembled members are fixed to the bottom frame with the fixing members.

In another aspect, a backlight module according to a preferred embodiment includes a plurality of lamps, a plurality of optical members and a frame. The frame is same as described in a previous paragraph. The lamps are positioned in the bottom frame under the optical elements.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present frame and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present frame and backlight module using the frame, in detail.

Figure 1:
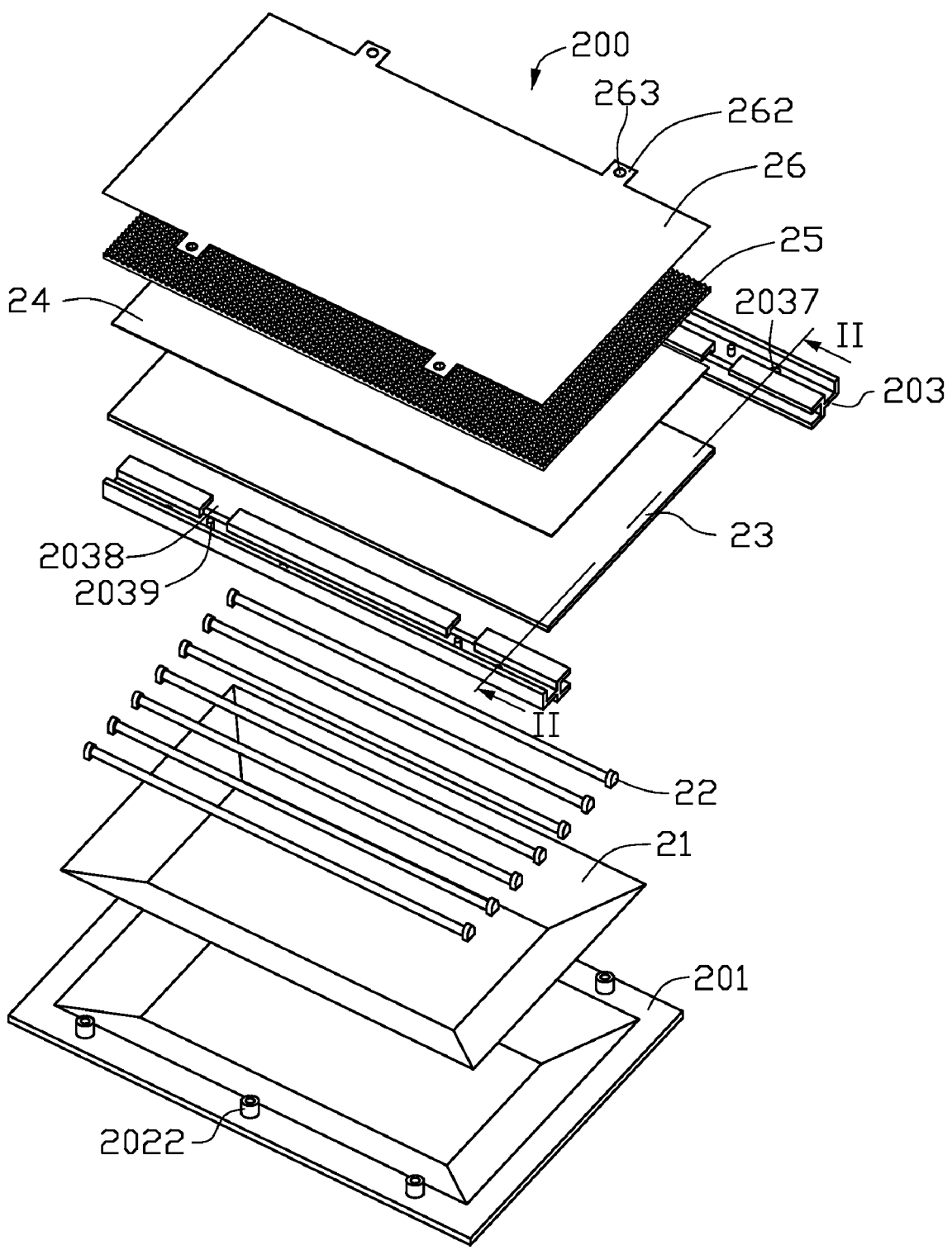
FIG. 1 is an exploded, isometric view of a backlight module according to a first preferred embodiment of the present invention.
Figure 2:
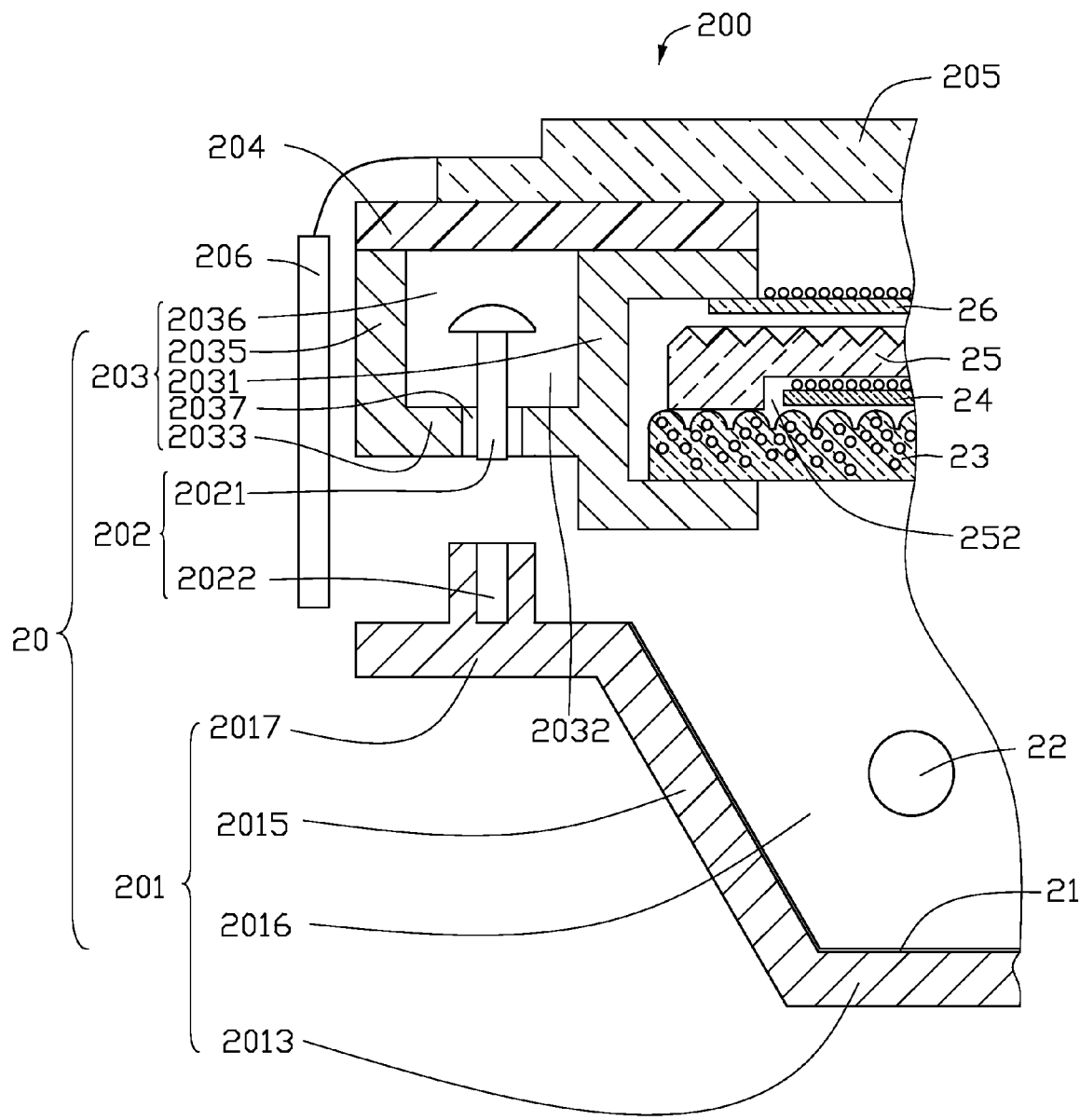
FIG. 2 is a side, partial, cross-sectional view of the backlight module of FIG. 1, the backlight module is assembled with a liquid crystal display panel and a drive circuit.

Referring to FIGS. 1 and 2, a backlight module 200 in accordance with a first preferred embodiment of the present invention is shown. The backlight module 200 includes a frame 20, a reflective plate 21, a plurality of lamps 22, and optical elements. The optical elements include a light diffusion plate 23, a lower light diffusion film 24, a prism sheet 25, and an upper light diffusion film 26.

The frame 20 includes a bottom frame 201, a plurality of fixing members 202, and two pre-assembled members 203. The bottom frame 201 includes a base 2013 and a plurality of contiguous sidewalls 2015. The sidewalls 2015 extend from a periphery of the base 2013. The sidewalls 2015 and the base 2013 cooperatively define a receiving chamber 2016 for receiving the lamps 22. The bottom frame 201 further includes a flange portion 2017 extending around edges of the sidewalls 2015. Each pre-assembled member 203 includes a C-shaped latching portion 2031 and an elongated base 2033 connected to the C-shaped latching portion 2031. The pre-assembled member 203 is made of plastic, or alternatively may be made of metal materials. The elongated base 2033 is parallel to the flange portion 2017 of one of the sidewalls 2015.

In this embodiment, one end of the elongated base 2033 is connected to a back portion of the C-shaped latching portion 2031. The elongated base 2033 and a bottom portion of the C-shaped latching portion 2031 lie in different planes. Each pre-assembled member 203 further includes a side plate 2035 perpendicularly extending from an opposite end of the elongated base 2033 outwards. The C-shaped latching portion 2031, the elongated base 2033, and the side plate 2035 cooperatively define a fixing chamber 2036 for receiving the fixing members 202, such as screws. The top surface of the side plate 2035 and the C-shaped latching portion 2031 lie in the same horizontal plane.

The light diffusion plate 23, the lower light diffusion film 24, the prism sheet 25, and the upper light diffusion film 26 can be pre-assembled with the two pre-assembled members 203. In other words, the optical elements are fixed together by the pre-assembled members 203. In this embodiment, the prism sheet 25 defines a receiving depression 252 for receiving the lower light diffusion film 24. The light diffusion plate 23, the prism sheet 25, and the upper light diffusion film 26 are stacked together in that order. The C-shaped latching portion 2031 of each pre-assembled member 203 further defines two cutouts 2038 above the elongated base 2033. The elongated base 2033 further defines two pins 2039 adjacent the corresponding cutouts 2038. The upper light diffusion film 26 includes a plurality of protruding portions 262 corresponding to the cutouts 2038 and pin holes 263 defined in each protruding portion 262. The upper light diffusion film 26 is precisely assembled to the pre-assembled members 203 by inserting the pins 2039 into the pin holes 263 of the upper diffusion film 26. In alternative embodiments, the cutouts 2038, the pins 2039 of the pre-assembled members 203, and the protruding portions 2038 of the upper light diffusion film 26 can be omitted. Edges on opposite sides of the light diffusion plate 23, the lower light diffusion film 24, the prism sheet 25, and the upper light diffusion film 26 are aligned and inserted into the C-shaped latching portions 2031 of the pre-assembled members 203 correspondingly.

In this embodiment, the elongated base 2033 defines a plurality of through holes 2037. The through holes 2037 are regularly arranged apart in a direction along the sidewall 2017. Each of the fixing members 202 includes a screw 2021, a screw column 2022 formed on the flange portion 2017 of the bottom frame 201 according to the through holes 2037. The screws 2021 pass through the through holes 2037 of the elongated base 2033, and are screwed into the corresponding screw columns 2022, thereby the two pre-assembled members 203 with the optical elements are fixed to the bottom frame 201 tightly.

In this embodiment, the backlight module 200 is used in a liquid crystal display device (not shown) having a liquid crystal display panel 205 and a drive circuit 206. The backlight module 200 further includes two cushion elements 204 disposed on the tops of the side plate 2035 and the C-shaped latching portion 2031. The liquid crystal display panel 205 is positioned on the cushion elements 204. The drive circuit 206 is connected to the liquid crystal display panel 205 and disposed at an outer side of the side plate 2035.

Because the optical elements are pre-assembled with the two pre-assembled members 203, a process for assembling the backlight module 200 is relatively quick, and it is not easy to damage or scratch the optical elements.

Figure 3:
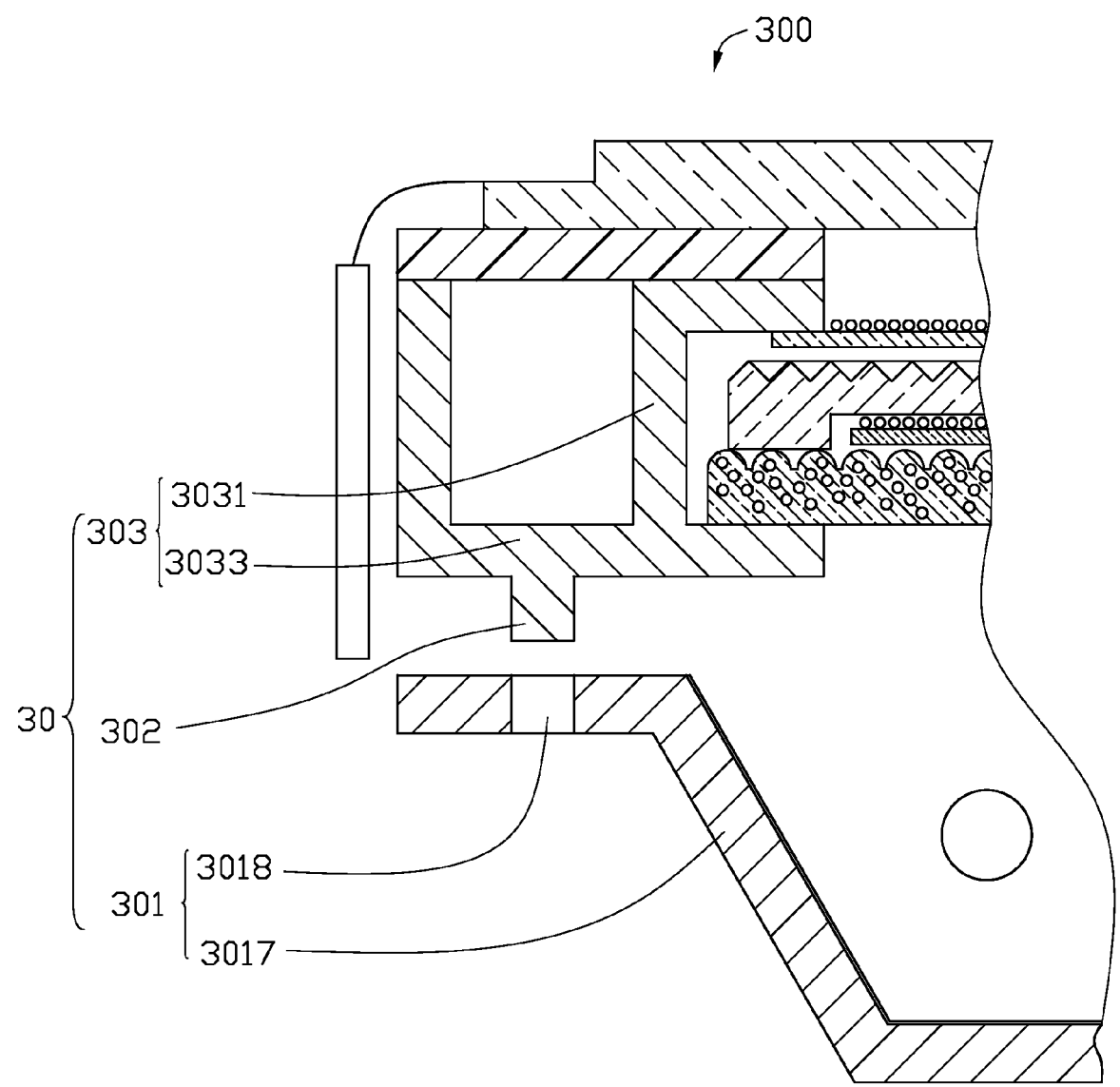
FIG. 3 is a side, partial, cross-sectional view of a backlight module according to a second preferred embodiment of the present invention.

Referring to FIG. 3, a backlight module 300 in accordance with a second preferred embodiment of the present invention is shown. The backlight module 300 includes a frame 30. The frame 30 includes a bottom frame 301, a plurality of fixing member 302, and two pre-assembled members 303. The backlight module 300 is similar in principle to the backlight module 200 of the first embodiment. However, an elongated base 3033 is connected to a bottom portion of each C-shaped latching portion 3031 of each pre-assembled member 303. The fixing members 302 are positioning pins protruded from a bottom surface of the elongated base 3033. A flange portion 3017 of the bottom frame 301 defines a plurality of pin holes 3018 corresponding to the positioning pins. The positioning pins are locked into the corresponding pin holes 3018, thereby the two pre-assembled members 303 are fixed to the bottom frame 301 tightly.

Figure 4:
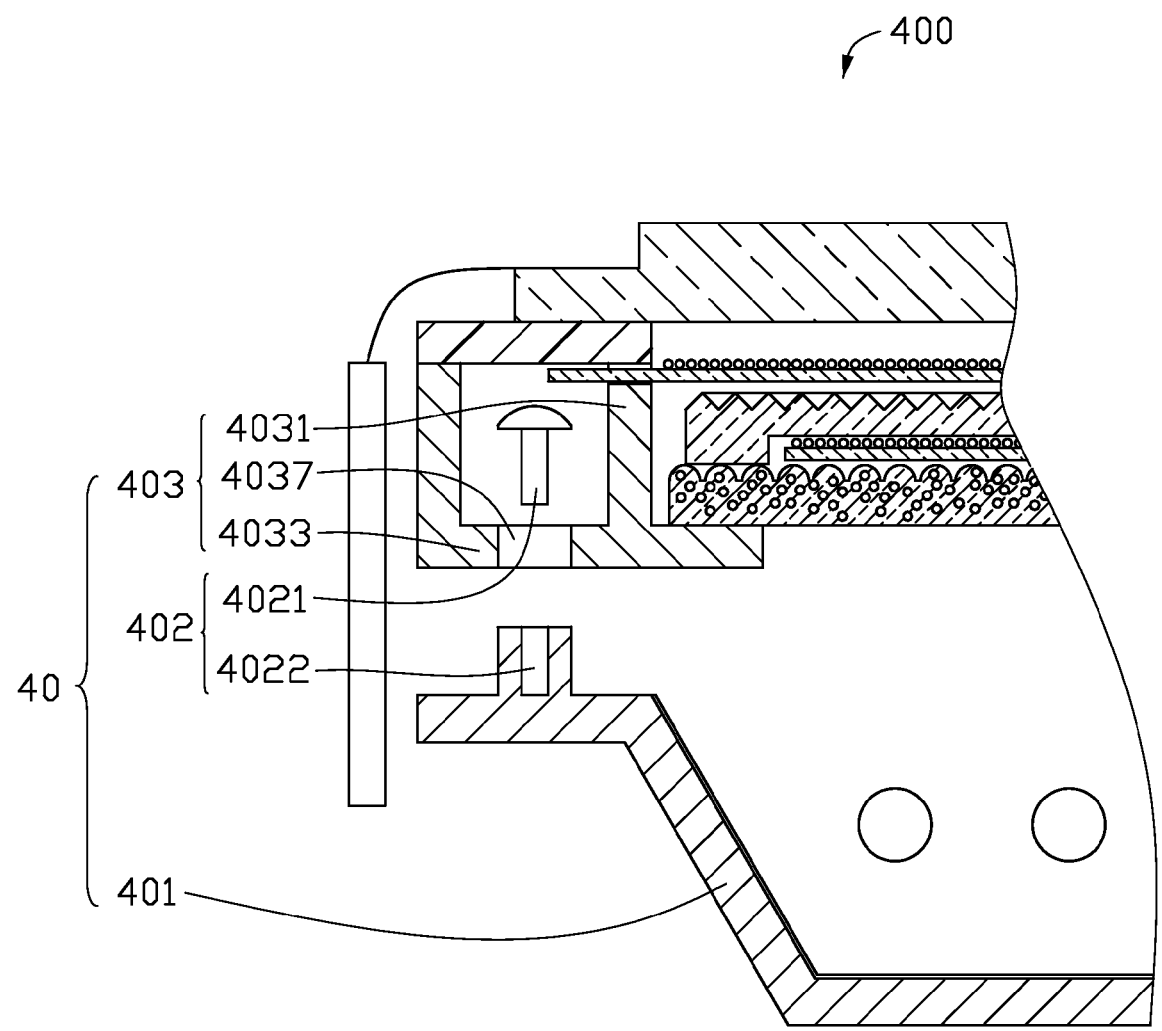
FIG. 4 is a side, partial, cross-sectional view of a backlight module according to a third preferred embodiment of the present invention.

Referring to FIG. 4, a backlight module 400 in accordance with a third preferred embodiment of the present invention is shown. The backlight module 400 includes a frame 40. The frame 40 includes a bottom frame 401, a plurality of fixing member 402, and two pre-assembled members 403. The backlight module 400 is similar in principle to the backlight module 200 of the first embodiment. However, each pre-assembled member 403 includes an L-shaped latching portion 4031 and an elongated base 4033 connected to a bottom portion of the L-shaped latching portion 4031. A diameter of each screw column 4022 is smaller than or equal to that of each through hole 4037, therefore, each screw column 4022 can be inserted into the through hole 4037 of the elongated base 4033.

Figure 5:
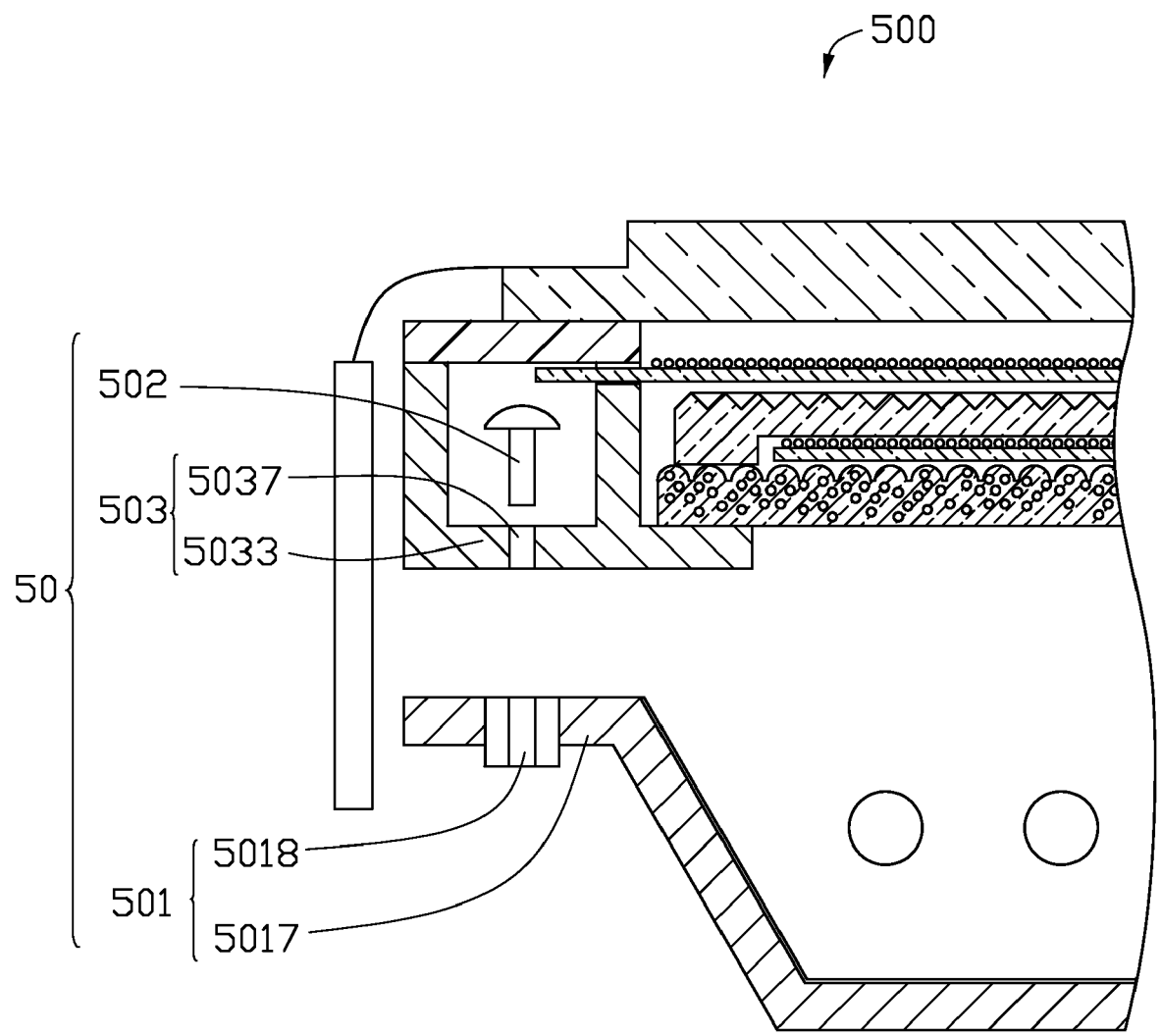
FIG. 5 is a side, partial, cross-sectional view of a backlight module according to a fourth preferred embodiment of the present invention.

Referring to FIG. 5, a backlight module 500 in accordance with a fourth preferred embodiment of the present invention is shown. The backlight module 500 includes a frame 50. The frame 50 includes a bottom frame 501, a plurality of fixing member 502, and two pre-assembled members 503. The backlight module 500 is similar in principle to the backlight module 400 of the third embodiment. However, a flange portion 5017 of the bottom frame 501 defines a screw hole 5018. The fixing members 502 are screws. The screws pass through the through holes 5037 of the elongated base 5033, and are screwed into the corresponding screw holes 5018 of the bottom frame 501, thereby the two pre-assembled members 503 are fixed to the bottom frame 501 tightly.

Figure 6:
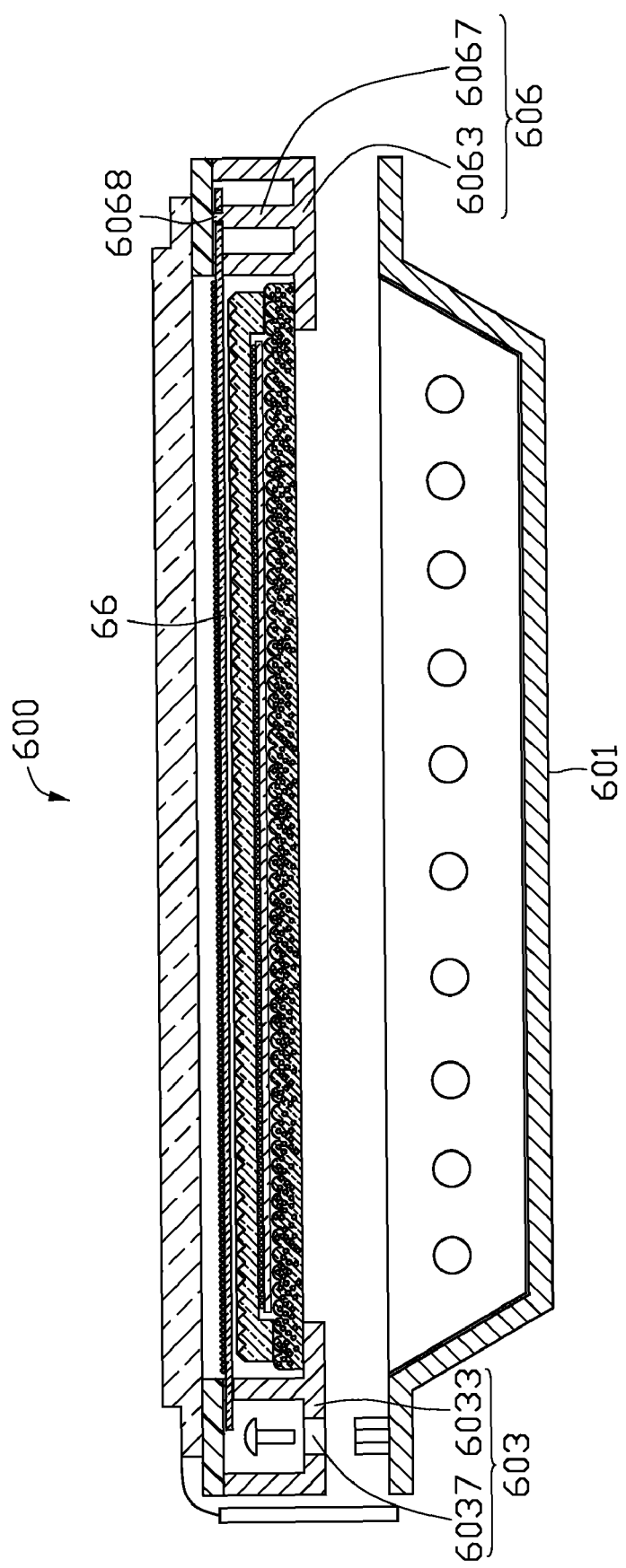
FIG. 6 is a side, partial, cross-sectional view of a backlight module according to a fifth preferred embodiment of the present invention.
Figure 7:
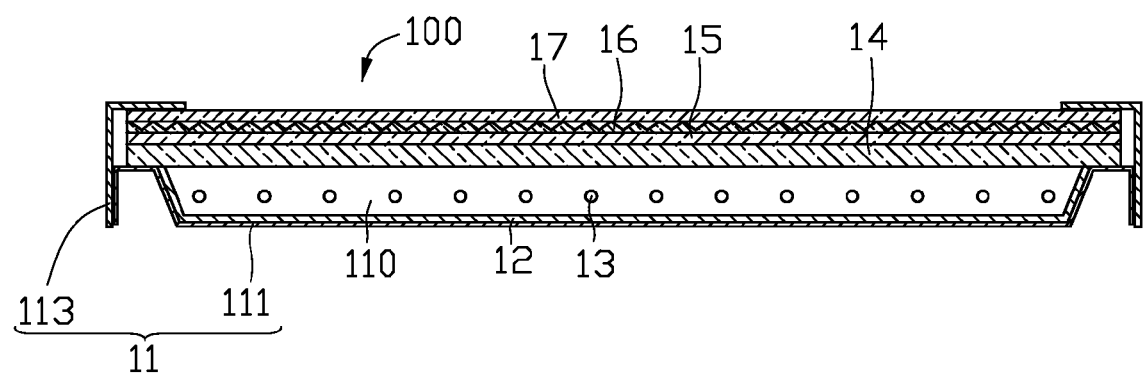
FIG. 7 is a side, cross-sectional view of a conventional backlight module.

Referring to FIG. 6, a backlight module 600 in accordance with a fifth preferred embodiment of the present invention is shown. The backlight module 600 includes a frame 60. The frame 60 includes a bottom frame 601 and two different pre-assembled members 603, 606. The backlight module 600 is similar in principle to the backlight module 400 of the third embodiment, except that the two pre-assembled members 603, 606 are different. The pre-assembled member 603 is similar to the pre-assembled member 403 of third embodiment. The pre-assembled member 606 is similar in principle to the pre-assembled member 603, except that a protruding column 6067 protruded out from elongated base 6063 of the pre-assembled member 606 replaces a through hole 6037 defined in elongated base 6033 of the pre-assembled member 603. The protruding column 6067 defines a pin 6068 at the top of the protruding column 6067 for positioning an upper light diffusion film 66. The pre-assembled member 606 is fixed to the bottom frame 601 by a double-sided adhesive tape or any other glue.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A frame comprising:
 a bottom frame,
 a plurality of fixing members, and
 two pre-assembled members, each pre-assembled member comprising an elongated base and a latching portion connected to the elongated base, wherein the pre-assembled members are fixed to the bottom frame with the fixing members, such that optical elements could be stacked together and fixed to the latching portions of the pre-assembled members, one end of the elongated base of each pre-assembled member is connected to a back portion of the latching portion; each pre-assembled member further comprises a side plate perpendicularly extending from an opposite end of the elongated base outwards; the latching portion, the elongated base, and the side plate cooperatively define a fixing chamber for receiving the fixing members, and each pre-assembled member further comprises a protruding column protruded out from the elongated base, and a pin defined at the top of the protruding column.

2. The frame according to claim 1, wherein the bottom frame comprises a base, a plurality of contiguous sidewalls, and a flange portion extending around edges of the contiguous sidewalls.

3. The frame according to claim 2, wherein the pre-assembled members are fixed to the flange portion of the bottom frame by a double-sided adhesive tape.

4. The frame according to claim 2, wherein the latching portion is one of a C-shaped latching portion and an L-shaped latching portion.

5. The frame according to claim 4, wherein each of the fixing members is a positioning pin protruding from a bottom surface of the elongated base, a flange portion of the bottom frame includes a plurality of pin holes to match the positioning pins, the positioning pins are locked into the corresponding pin holes, thereby each pre-assembled member is fixed to the bottom frame.

6. The frame according to claim 4, wherein the elongated base includes a plurality of through holes, each of the fixing members comprises a screw, a screw column formed on the flange portion of the bottom frame to match the through holes, the screws passing through the corresponding through holes, and screwed into the corresponding screw columns, thereby each pre-assembled members is fixed to the bottom frame.

7. The frame according to claim 6, wherein a diameter of each of the screw columns is smaller than or equal to that of each of the through holes, each screw column is inserted into the through hole of the elongated base.

* * * * *